3,654,327
METHODS OF CONVERTING COCOA BUTTER TO FREE ACIDS

Charles S. Castner, Reading, Pa., assignor to Schuyler Development Corporation
No Drawing. Filed May 4, 1970, Ser. No. 34,602
Int. Cl. C11c 1/02
U.S. Cl. 260—418                              5 Claims

ABSTRACT OF THE DISCLOSURE

A method of converting cocoa butter to free acids is provided by the steps of melting the cocoa butter, reacting the melted cocoa butter with caustic at elevated temperature to complete hydrolysis and then reacting the resultant hydrolyzed cocoa butter with an acid to a maintained pH of 6.6 to 6.8 with agitation and washing and recovering the resultant reaction product.

---

This invention relates to methods of converting cocoa butter to free acids and particularly to a method of converting the triglycerides in cocoa butter to free fatty acids without the loss of any significant portion thereof.

Cocoa butter is known to be essentially a large number of triglycerides in varying amounts. It is also known that it is very difficult to obtain all the triglycerides by ordinary methods of saponification for reasons which are not completely understood by me. It is known, however, that cocoa butter and cocoa butter fatty acids solidify to difficulty manageable hard masses even at ordinary temperature and must be heated and held hot if they are to be transported by pipe or tank car or truck. The triglyceride materials recovered from cocoa butter by standard saponification techniques seldem have an iodine number above 25 whereas materials recovered by the method of this invention have in general, an iodine number of 30 or above. This indicates a clear difference in the character of the two recovered materials.

The free fatty acids produced by the method of this invention not only have a higher iodine number than those prepared by ordinary saponification techniques but in addition appear to have the unique property of carrying a great variety of medicinal agents through or at least deep into the epidermal and sub-dermal tissues. For example aspirin can be dissolved or at least completely dispersed in the material of this invention and when applied to the surface of the skin appears to be carried into the skin surface. Similarly hexachlorophene, dichlorophene and other germicidal agents are readily dissolved and act as highly effective skin cleansing and purifying agents as for example in bovine teat dips, surgical soaps, cosmetic bases, shampoos etc.

Material produced according to this invention has, in addition, a uniquely different physical character. It is a soft, creamy mass which can be easily handled with pumps, tanks and the like without the need for constant relatively high temperatures heretofore required for handling cocoa butter and cocoa butter fatty acids.

Preferably I react melted cocoa butter and hot sodium hydroxide or similar caustic in the presence of hot water at a temperature in the range 160° F. to 212° F. This mixture is held at elevated temperature and stirred continuously until hydrolysis is completed. When hydrolysis is completed, the mass is acidified by slow addition of hydrochloric acid accompanied by vigorous stirring to a pH in the range 6.6 to 6.8. The resulting mass is then washed with water to remove soluble salts, excess hydrochloric acid and glycerine.

It is essential that the free acids be formed in the range of pH 6.6 and 6.8. Above pH 6.8 the product is a hard lumpy mass. Below pH 6.6 the product is another hard mass which is virtually unusable because of the difficulty in handling it.

In the foregoing general statement of this invention certain objects, purposes and advantages have been outlined. Other objects, purposes and advantages will be apparent from a consideration of the following examples showing certain preferred practices according to this invention.

EXAMPLE I

Twenty-nine and seven tenths (29.7) pounds of cocoa butter was melted and it together with hot (160°–212° F.) sodium hydroxide, eight (8.0) pounds was added to a reactor vessel containing 75 pounds of hot water (160°–212° F.). The reaction mixture was stirred constantly and was checked for completion of hydrolysis after 30 minutes of stirring. Successive checks for completion of hydrolysis were made every 15 minutes until hydrolysis was completed. The progress of hydrolysis was monitored by removing a small portion of reaction mixture to a beaker of water and observing the result. When hydrolysis is complete the material is completely dissolved. If incomplete the unreacted butter is readily seen on the surface of the beaker.

When hydrolysis was completed, the mass was blended with sufficient hydrochloric acid to provide and maintain a pH of 6.6 to 6.8 with constant agitation. The resulting product was then washed with distilled water to remove NaCl and any other salts in the solution.

The resulting product was a milk white creamy paste, soft to the touch and easily handled.

EXAMPLE II

A similar amount of cocoa butter and sodium hydroxide were added to hot water in a reactor as in Example I. As the reaction progressed solids accumulated on the surface and were removed to another vessel. At the same time an amount of melted cocoa butter and sodium hydroxide was added to the reactor equivalent to that present in the removed solids. The removed surface solids were treated with hydrochloric acid to maintain a pH of 6.6 to 6.8 and agitated to convert the hydrolyzed cocoa butter to free fatty acids. The fatty acids were removed as a white, soft, creamy mass. This run was operated in a continuous fashion as distinguished from the batch operation of Example I. The results were the same in both cases.

While sodium hydroxide and hydrochloric acid were used in these examples and in the general description in order that the salt produced by reaction would be sodium chloride, it is obvious that other caustic e.g. potassium hydroxide and other acids might be used, providing traces of the resulting salts would not be detrimental.

While I have set out certain preferred practices of my invention in the foregoing specification it will be understood that this invention may be otherwise embodied within the scope of the following claims.

I claim:

1. The method of recovering cocoa butter fatty acids comprising the steps of
   (a) melting cocoa butter,
   (b) adding the melted cocoa butter together with a caustic at elevated temperature into water above about 160° F.
   (c) agitating the mixture until hydrolysis of the cocoa butter is complete,
   (d) adding to acid to the hydrolyzed cocoa butter with constant agitation to a maintained pH of 6.6 to 6.8,
   (e) washing the cocoa butter reaction product to remove soluble salts and
   (f) collecting the washed cocoa butter product.

2. The method as claimed in claim 1 wherein the caustic is sodium hydroxide.

3. The method as claimed in claim 1 wherein the added acid is hydrochloric acid.

4. The method as claimed in claim 1 wherein the cocoa butter and its reaction product are maintained at a temperature between 160° F. and 212° F. during the entire reaction.

5. A cocoa butter fatty acid mass having a pH between 6.6 and 6.8 and an iodine number in excess of 30 and characterized by being a white creamy soft pumpable mass.

References Cited

UNITED STATES PATENTS

| 2,159,700 | 5/1939 | Hennig | 260—418 |
| 2,452,725 | 11/1948 | Bradshaw | 260—418 |

LEWIS GOTTS, Primary Examiner

E. G. LOVE, Assistant Examiner